(12) United States Patent
Mannheim Astete et al.

(10) Patent No.: US 11,034,136 B2
(45) Date of Patent: Jun. 15, 2021

(54) INTRUSION RESISTANT LAMINATED AUTOMOTIVE GLAZING

(71) Applicant: AGP AMERICA S.A., Ciudad de Panamá (PA)

(72) Inventors: Mario Arturo Mannheim Astete, Lima (PE); Charles Stephen Voeltzel, Lima (PE); Edward Enrique Custodio Sheen, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 16/498,713

(22) PCT Filed: Mar. 22, 2018

(86) PCT No.: PCT/IB2018/051957
§ 371 (c)(1),
(2) Date: Sep. 27, 2019

(87) PCT Pub. No.: WO2018/178825
PCT Pub. Date: Oct. 4, 2018

(65) Prior Publication Data
US 2020/0039187 A1    Feb. 6, 2020

Related U.S. Application Data

(60) Provisional application No. 62/477,399, filed on Mar. 27, 2017.

(51) Int. Cl.
*F41H 5/04* (2006.01)
*F41H 7/00* (2006.01)
*B32B 17/10* (2006.01)

(52) U.S. Cl.
CPC .. *B32B 17/10137* (2013.01); *B32B 17/10018* (2013.01); *B32B 17/1077* (2013.01);
(Continued)

(58) Field of Classification Search
CPC ........ B32B 17/10137; B32B 17/10018; B32B 17/10091; B32B 17/10119;
(Continued)

(56) References Cited

U.S. PATENT DOCUMENTS 2,466,078 A   4/1949   Boicey
4,299,639 A   11/1981  Bayer
(Continued)

FOREIGN PATENT DOCUMENTS

DE    19757061 A1    7/1999
DE    102009058136 A1   6/2011
(Continued)

OTHER PUBLICATIONS

Office Action—Related U.S. Appl. No. 16/499,677.
Office Action—Related U.S. Appl. No. 16/627,873.

*Primary Examiner* — Tahseen Khan
(74) *Attorney, Agent, or Firm* — The Morales Law Firm; Joseph L. Morales

(57) ABSTRACT

Improved automotive security has led to an increase in carjacking and smash and grab crimes. Tempered glass offers little resistant to attacks. Laminated glass improves penetration resistance but only by several seconds. By including a stiff frame in the laminate and a plastic interior 5 layer, the present invention significantly increases the amount of time that an occupant has to react and possibly escape an attack by driving off or for the attack to be detected. In the event of an accident, the invention also provides improved occupant retention, especially for movable glass that is not bonded to the vehicle.

20 Claims, 10 Drawing Sheets

Exterior side

Interior side

(52) U.S. Cl.
CPC .. *B32B 17/10091* (2013.01); *B32B 17/10119* (2013.01); *B32B 17/10174* (2013.01); *B32B 17/10761* (2013.01); *B32B 17/10788* (2013.01); *B32B 2605/006* (2013.01)

(58) Field of Classification Search
CPC ........ B32B 17/10761; B32B 17/10788; B32B 17/10174
USPC ....................................................... 428/34.6
See application file for complete search history.

(56) References Cited

U.S. PATENT DOCUMENTS

| | | | |
|---|---|---|---|
| 4,901,476 | A | 2/1990 | Nagashima et al. |
| 5,071,692 | A | 12/1991 | Jourdaine |
| 6,280,847 | B1 | 8/2001 | Corkhill et al. |
| 6,737,151 | B1 | 5/2004 | Smith |
| 2001/0032540 | A1 | 10/2001 | Gourio |
| 2003/0111159 | A1 | 6/2003 | Hashimoto et al. |
| 2008/0032104 | A1 | 2/2008 | Astete et al. |
| 2008/0187721 | A1* | 8/2008 | Engl ................. F41H 5/04 428/172 |
| 2010/0233453 | A1 | 9/2010 | Hashimoto |
| 2013/0302581 | A1* | 11/2013 | Mannheim Astete ........... B32B 17/10064 428/214 |
| 2014/0060306 | A1* | 3/2014 | Bertolini ............ B32B 17/1077 89/36.02 |
| 2015/0000511 | A1 | 1/2015 | Engl |
| 2015/0107167 | A1* | 4/2015 | Baumann ............ E06B 3/66328 52/172 |
| 2015/0292841 | A1 | 10/2015 | Fultz et al. |
| 2016/0282645 | A1 | 9/2016 | Wang et al. |
| 2016/0354996 | A1* | 12/2016 | Alder ................ B32B 17/10743 |
| 2017/0165945 | A1* | 6/2017 | Payen ................. G10K 11/172 |
| 2020/0174293 | A1* | 6/2020 | Labrot ............. B32B 17/10302 |
| 2020/0230920 | A1* | 7/2020 | Keller ....................... B60J 3/04 |
| 2021/0016640 | A1* | 1/2021 | Manz ..................... G02F 1/137 |

FOREIGN PATENT DOCUMENTS

| | | |
|---|---|---|
| GB | 2264452 B | 11/1995 |
| WO | 1999058334 A2 | 11/1999 |
| WO | WO-2015079160 A1 * | 6/2015 ........... G10K 11/172 |

* cited by examiner

Exterior side

Interior side

INTRUSION RESISTANT LAMINATED AUTOMOTIVE GLAZING

FIELD OF THE INVENTION

The present invention relates to the field of laminated automotive safety glazing.

BACKGROUND OF THE INVENTION

In recent years, the security of automotive vehicle ignition systems has been improved to the point where it has become virtually impossible to steal a car without having the keys or a tow truck. Similarly, the doors and locks have been improved making it extremely difficult to get into a car without either the keys or breaking the glass. While these improvements decrease the incidence of vehicle related theft they have led to an increase in more serious crimes known as "smash and grab" and "carjacking" as thieves have adapted to the new technology. In a smash and grab, the thief breaks a window and grabs a purse, computer, GPS or other valuable. In a car-jacking, the driver is forced to hand over the vehicle to the thief.

Vehicles are especially vulnerable to these types of crimes due to the type of glass that is used in most of them. A closed window does not deter a determined thief due to the ease with which most car windows can be broken.

The glass used in the doors, rear window and side windows of most vehicle is made from tempered glass as shown in FIG. 1A. Tempered glass is much stronger than ordinary glass. Heat strengthened, full temper, soda lime float glass, with a compressive strength in the range of at least 70 Mpa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression are no longer in balance and the entire glass part breaks into small beads with dull edges. While tempered glass can withstand high loads, it can be easily broken by striking with a hard object or through the use of a spring loaded center punch. When tempered glass fails, the entire window opening is left unprotected.

Another problem that tempered glass presents is when it fails during an accident. In this case, and especially in a rollover accident, the glass disintegrates leaving the window opening with nothing to prevent ejection of the occupant. Ejection of the occupant and the extension of portions of the body through window openings is a major cause of traffic fatalities and injuries.

On the other hand, windshields are made of laminated annealed glass as shown in FIG. 1B. Annealed glass is glass that has been slowly cooled from the bending temperature down through the glass transition range. This is done to relieve any stress in the glass. Annealed glass breaks into large shards with sharp edges. In a laminate, two sheets of annealed glass are bonded together using a thermo plastic (interlayer). For automotive applications, the most commonly used bonding layer or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used.

If the laminated glass should break, the bonding layer holds the shards of glass together, helping to maintain the structural integrity of the glass. The shards of broken glass tend to interlock much like the pieces of a jigsaw puzzle. A vehicle with a broken windshield can still be operated, often for an extended period if the damage is not in the vision zones or too extensive. On impact, the bonding layer also helps to prevent penetration by the occupant in the event of a collision or by objects striking the laminate from the exterior of the vehicle.

Due to the lower cost and higher strength of tempered glass, tempered glass has been favored for all but the windshield position where tempered glass is not permitted. However, on some higher end vehicles, laminated glass has been used for the doors rather than tempered glass. This is at least in part to improve the safety and security of the occupants but also for the improved sound dampening that a laminate provides and to facilitate the use of heat reflecting coatings for solar control. Laminated glass has also been used for the side windows on some passenger vans, primarily to improve occupant retention in the event of a rollover accident.

With a laminated side window, intrusion time into the vehicle by an attacker is significantly increased. However, the time that it takes for an aggressive determined attacker to penetrate a conventional laminate is measured in several seconds. A significant enough delay that might help to overcome the advantage of surprise and provide sufficient time for escape but is still less than ideal. In the event of a rollover accident, glass that is not glued into the vehicle opening, has been found to be little better than tempered glass. Once the laminated glass breaks, it offers little resistance to penetration.

Another issue encountered when using laminated glass as an alternative to tempered in side windows is thickness. A laminated window requires a bonding layer. To maintain the same thickness, less glass must be used. A 4 mm tempered window 2 (FIG. 1A) might be replaced with a laminate comprised of two 1.6 mm glass layers 2 bonded with a 0.76 layer of PVB 4 (FIG. 1B). This reduces the thickness of the glass present by 0.8 mm or 20% leaving the window more susceptible to breakage from door slams and other shocks. Even if the 1.6 mm glass is heat strengthened, it is not possible to achieve the same level of strength as with a 4 mm thick glass due to the limitations of the conventional low pressure air tempering process common in the industry. The limit for full temper is approximate 3.2 mm. If the thickness is increased, channels 20 and seals may need to be changed to accommodate.

Clearly, a glazing that could overcome these drawbacks would be desirable.

SUMMARY OF THE INVENTION

The intrusion resistance laminate of the invention is an assembly comprising: a glass layer having oppositely disposed major faces; a frame having oppositely disposed major faces; a spacer having oppositely disposed major faces; a plastic layer having oppositely disposed major faces; and at least two bonding layers. The frame substantially surrounds the vision area of said laminate (day light opening or DLO). The spacer comprises a transparent material with said spacer having a thickness which is about the same as said frame and sized to fit the interior portion of said frame.

One major face of said frame and corresponding major face of said spacer bonded to corresponding major face of said glass layer by means of a first bonding layer of said at least two bonding layers. In addition, opposite major face of said frame and corresponding major face of said spacer bonded to corresponding major face of said plastic layer by means of a second bonding layer of said at least two bonding layers.

This configuration allows for a thicker composition to be used as a direct replacement to a thinner conventional glazing with no modification to channels, seals or other components comprising the door and operating mechanism. As a result, installation in the vehicle requires no more time and effort than normally required to replace the window.

Advantages include:
Direct replacement for conventional glazing.
Operating force required similar to conventional glazing.
No modifications to channels 20, seals and other components needed to install.
Quick easy installation.
High level of intrusion resistance (up to 3 times that of a similar laminated window).
Increased protection from occupant ejection in the event of an accident.
Lower cost.

REFERENCE NUMERALS

Figures 1A, 1B:
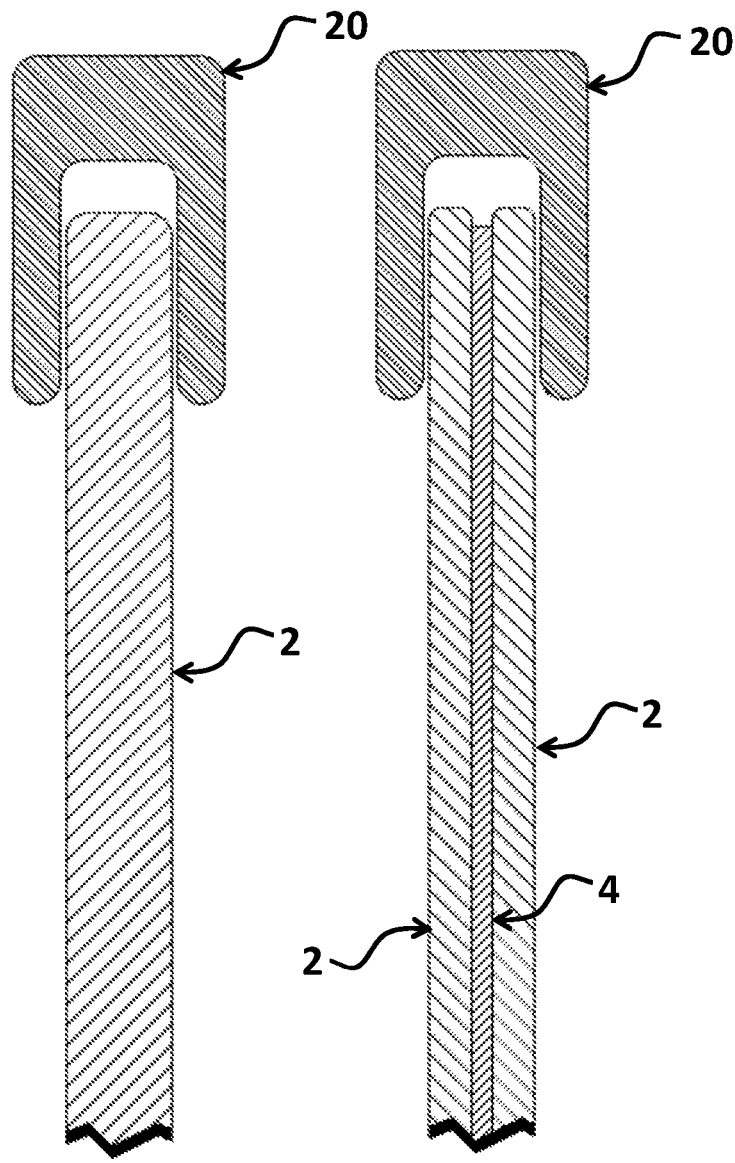
FIG. 1A shows the cross section of a tempered window according to prior art.
FIG. 1B shows the cross section of a laminated window according to prior art.

2 Glass layer
3 IR film
4 Bonding layer
5 IR coating
6 Black obscuration
7 Adhesive
10 Plastic layer
12 Frame layer
14 Spacer
15 Scratch resistant coating
18 Sheet metal
20 Channel
101 Surface one
102 Surface two
103 Surface three
104 Surface four
201 Layer one—outer exterior layer, adjacent to the exterior of the vehicle
202 Layer two—inner interior layer, adjacent to the inside of the passenger compartment

DETAILED DESCRIPTION OF THE INVENTION

Figure 2:
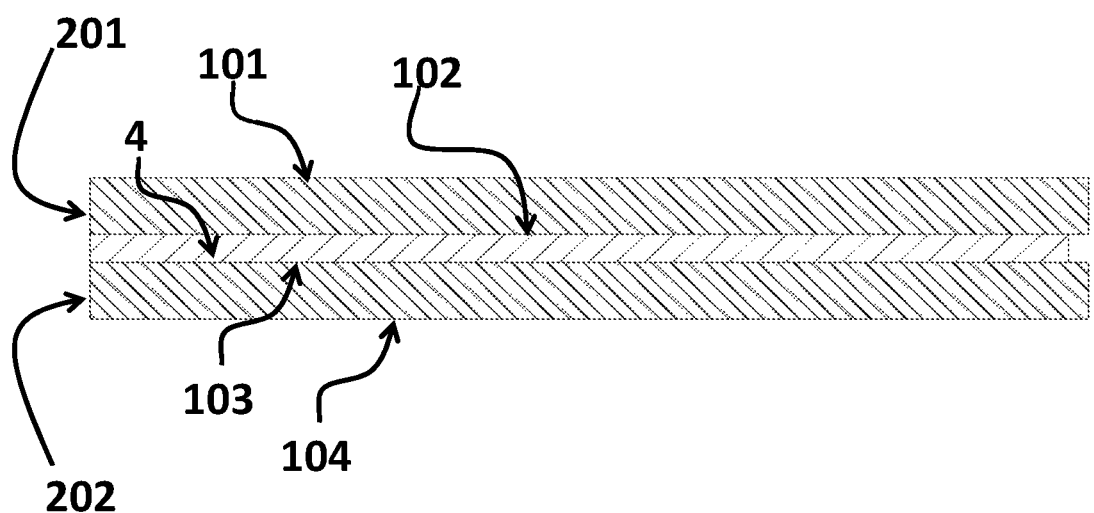
FIG. 2 shows a cross section of a typical laminated glazing.

As shown in FIG. 2, standard terminology is used to describe the configuration of a laminated glazing wherein a normal automotive windshield is comprised of at least two layers, exterior layer 201 and interior layer 202, said layers being bonded together with at least one bonding layer 4. The surface that is on the outside of the vehicle is referred to as surface one 101 or the number one surface. The opposite face of the exterior layer 201 is surface two 102 or the number two surface. The surface that is on the inside of the vehicle is referred to as surface four 104 or the number four surface. The opposite face of the interior layer 202 is surface three 103 or the number three surface.

Figure 3:
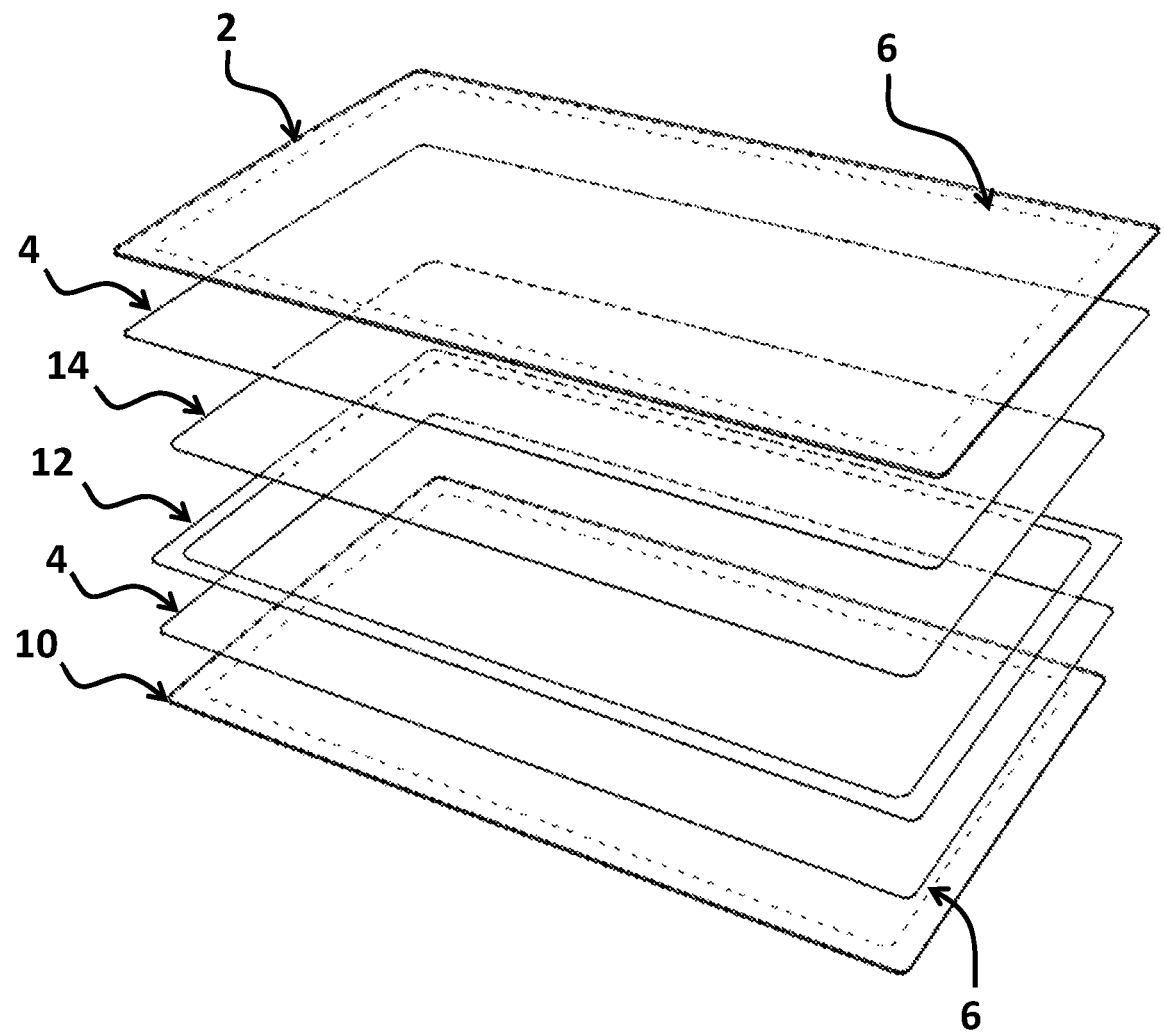
FIG. 3 shows an exploded view of an exemplary embodiment of the present invention.

As shown in FIG. 3, the intrusion resistance laminate of the invention is an assembly comprising: a glass layer 2, a frame 12, a spacer 14, a plastic layer 10 and bonding layers 4. The frame 12 substantially surrounds and encloses the vision area of the laminate (day light opening or DLO). The frame 12 is bonded to the major faces of the glass layer and the plastic layer 10 by the bonding layers 4. The spacer 14 is a transparent material which is about the same thickness as the frame 12 and is used as a spacer 14 between the two bonding layer, one of each is adjacent to each of the glass layer 2 and the plastic layer 10.

Figure 4:
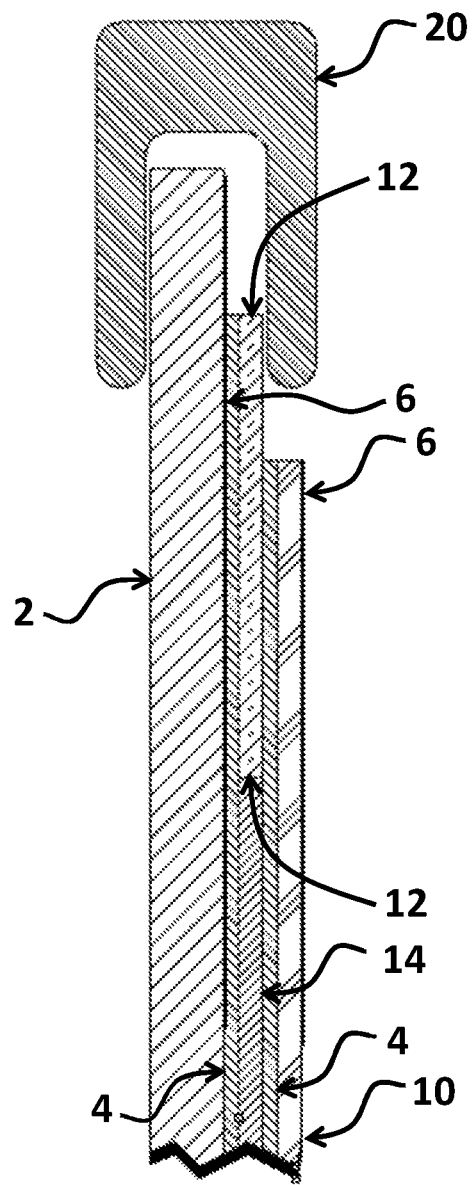
FIG. 4 shows the cross section of a laminated glass according to an embodiment of the present invention.

The spacer 14 is sized to precisely fit the interior portion of the frame 12. The spacer 14 may be made of the same material as used for the bonding layer or another transparent material. In some embodiments (e.g. FIG. 4), the edge of the frame 12 and the plastic layer 10 may be offset inboard from the edge of glass to accommodate seals and channels 20 that the glass must fit into. This allows for a thicker composition to be used as a direct replacement to a thinner conventional glazing with no modification to channels 20, seals or other components comprising the door and operating mechanism.

In several embodiments, the types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

One of the big advantages of a laminated window over a tempered is that a laminated can make use of heat absorbing glass, infrared reflecting coatings and infrared reflecting films. Tempered monolithic windows can only make use of heat absorbing compositions to control solar load. A heat absorbing window can be very effective but the glass itself, absorbs the heat, as intended but then allows energy to transfer to the passenger compartment through convective transfer and radiation whereas the infrared reflecting coatings and films reflect the heat back to the atmosphere allowing the glass so stay cooler.

Figure 5A:
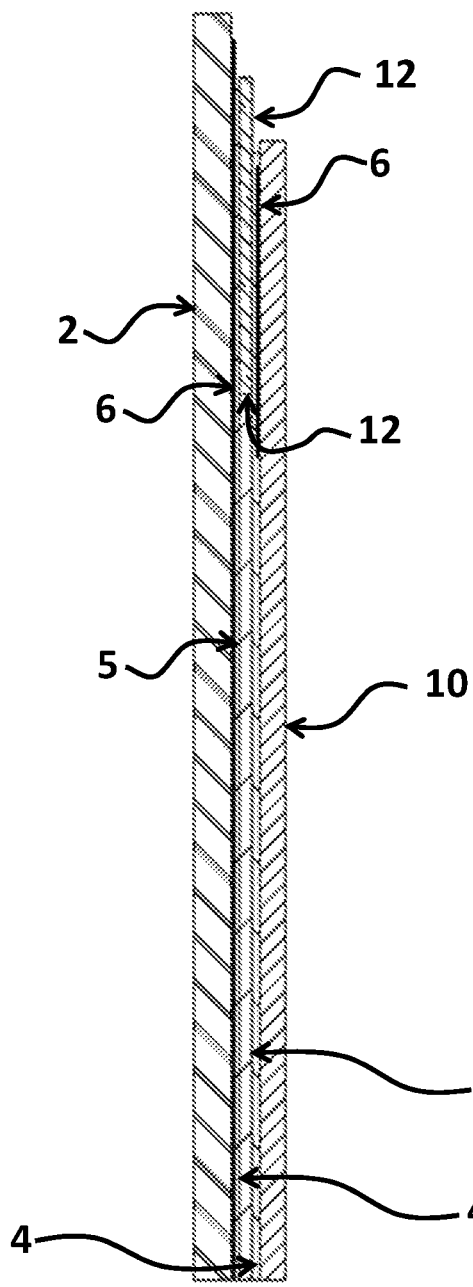
FIG. 5A shows a cross section of a laminated glass according to an embodiment of the present invention.

Infrared reflecting coatings 5, such as that shown in FIG. 5A, include but are not limited to the various metal/dielectric layered coatings applied though magnetron sputtered vacuum deposition (MSVD) as well as others known in the art that are applied via pyrolytic, spray, CVD, dip and other methods.

Figure 5B:
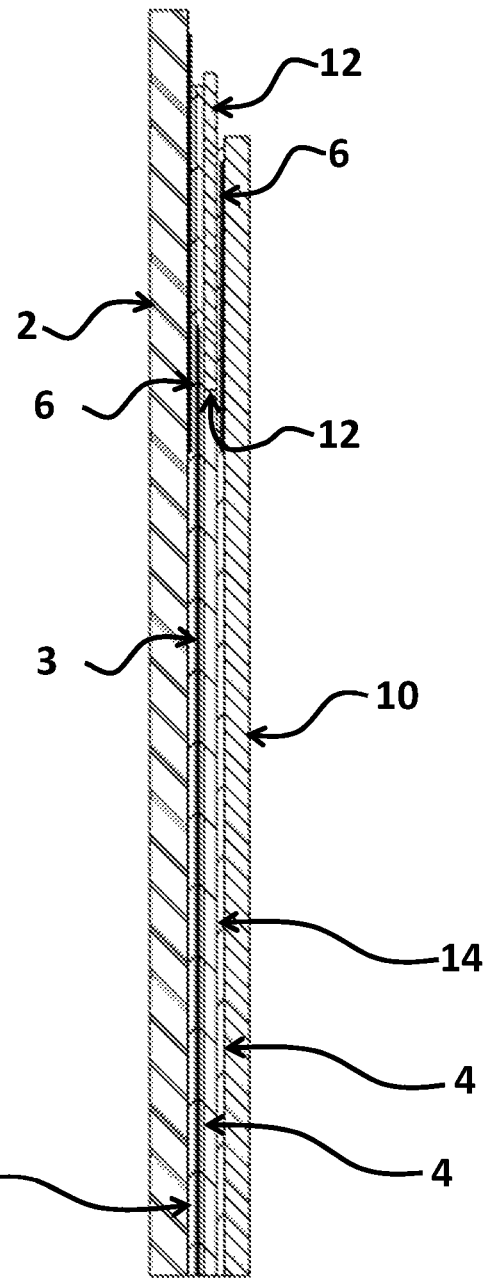
FIG. 5B shows a cross section of a laminated glass according to an embodiment of the present invention.

Infrared reflecting films 3, such as that shown in FIG. 5B, include both metallic coated substrates as well as organic based optical films which reflect in the infrared.

The glass layer may be annealed or strengthened. Two processes can be used to increase the strength of glass. They are thermal strengthening, in which the hot glass is rapidly cooled and chemical tempering which achieves the same effect through an ion exchange chemical treatment.

In the chemically tempered process, ions in and near the outside surface of the glass are exchanged with ions form the bath that are larger. This places the outer layer of glass in compression. Compressive strengths of up to 1,000 Mpa are possible. Chemical tempering is performed by immersing the glass in a bath of molten potassium nitrate. During the process, potassium ions replace ions of smaller elements in the glass surface creating a compression layer. The tempered strength is a function of the time that the glass is treated, the temperature of the bath, and the glass composition. The strength correlates to the depth of the compression layer. Typical parameters for chemical tempering are treatment at a temperature ranging from 350 to 475° C. for a period from 2 to 24 hours.

Unlike heat tempered glass, chemically tempered glass breaks into shards rather than the small bead typical of heat treated glass further improving the intrusion resistance of the window as the shards, held together by the bonding layer, tend to interlock maintaining structural integrity.

The bonding layer has the primary function of bonding the major faces of adjacent layers to each other. As an example, shown in FIG. 2, surface two 102 of the exterior layer 201 is bonded to surface three 103 of the layer adjacent and below by the bonding layer 4. The material selected is typically a clear plastic. For automotive use, the most commonly used bonding layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. A wide variety of adhesives can be used when bonding glass to a non-glass layer or when bonding non-glass layers to each other.

Figure 6B:
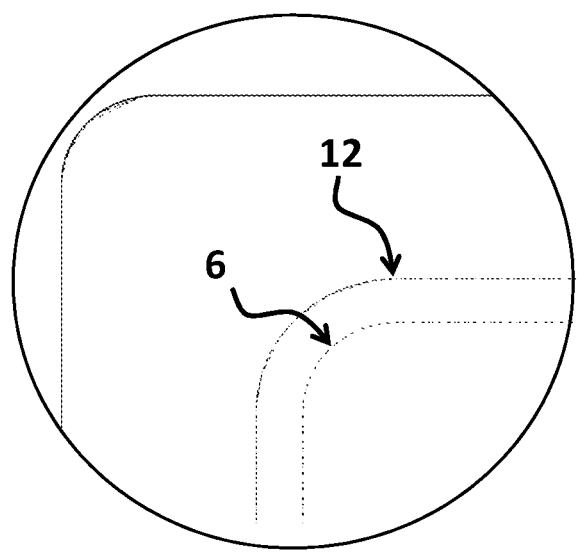
FIG. 6B shows the corner detail of FIG. 6A.
Figure 6A:
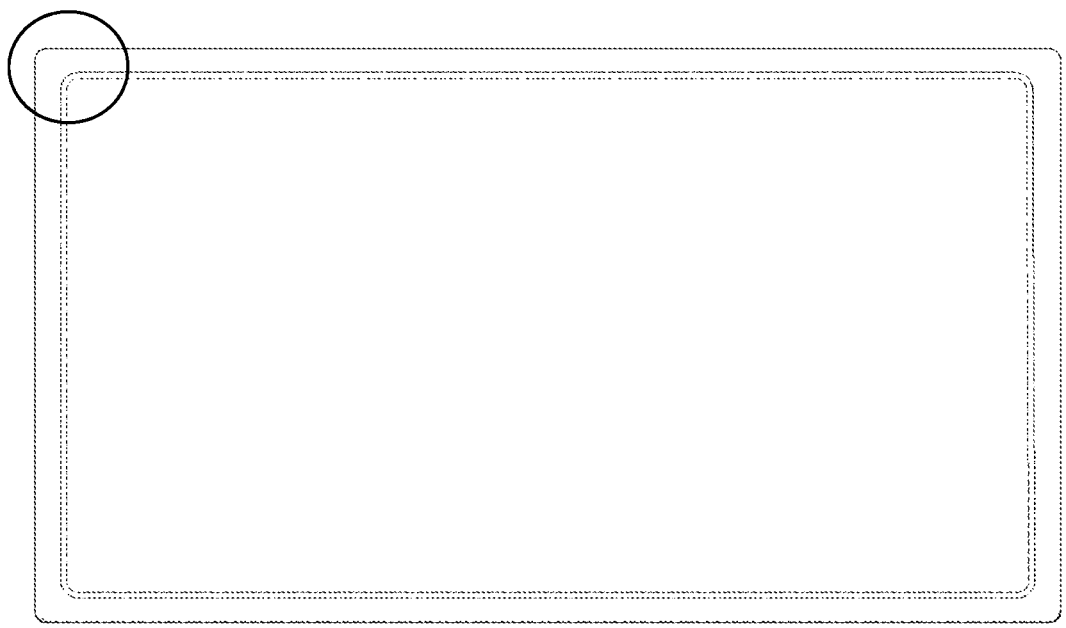
FIG. 6A shows a side view of the laminate of FIG. 3.
Figure 7:
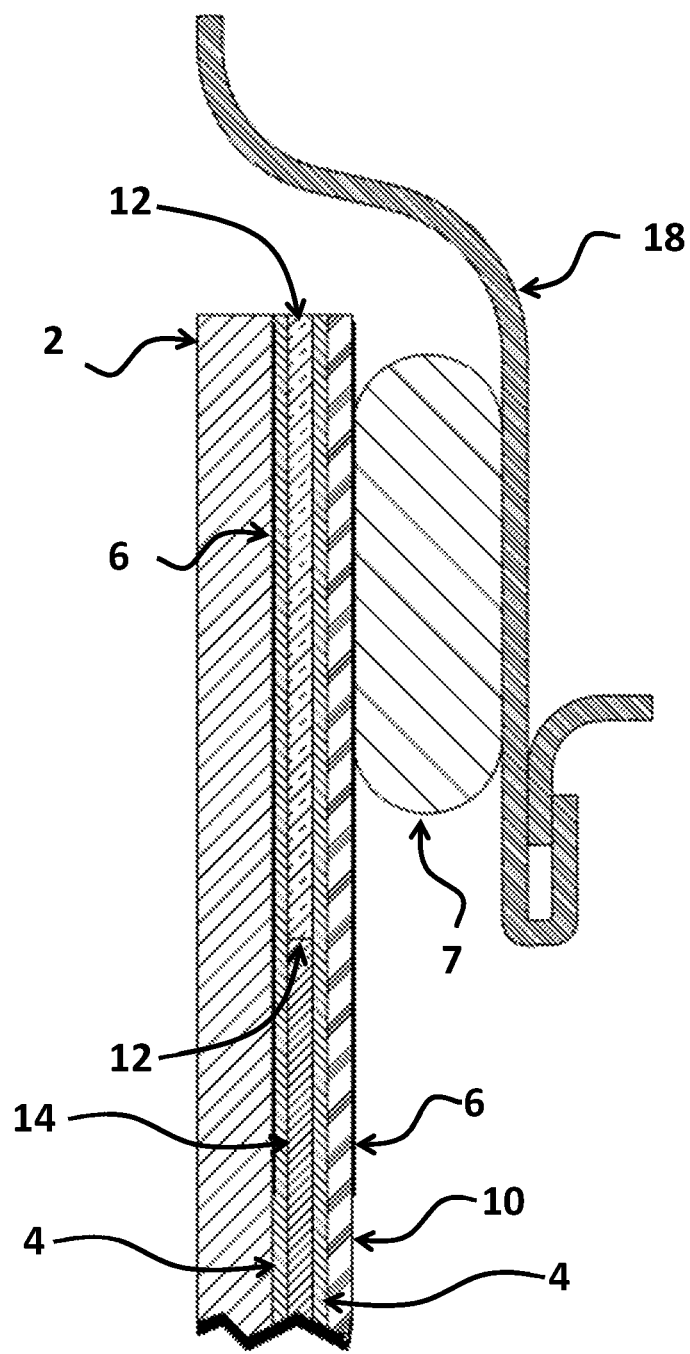
FIG. 7 shows a cross section of a laminated glass according to an embodiment of the present invention installed in a typical car door frame.
Figure 8B:
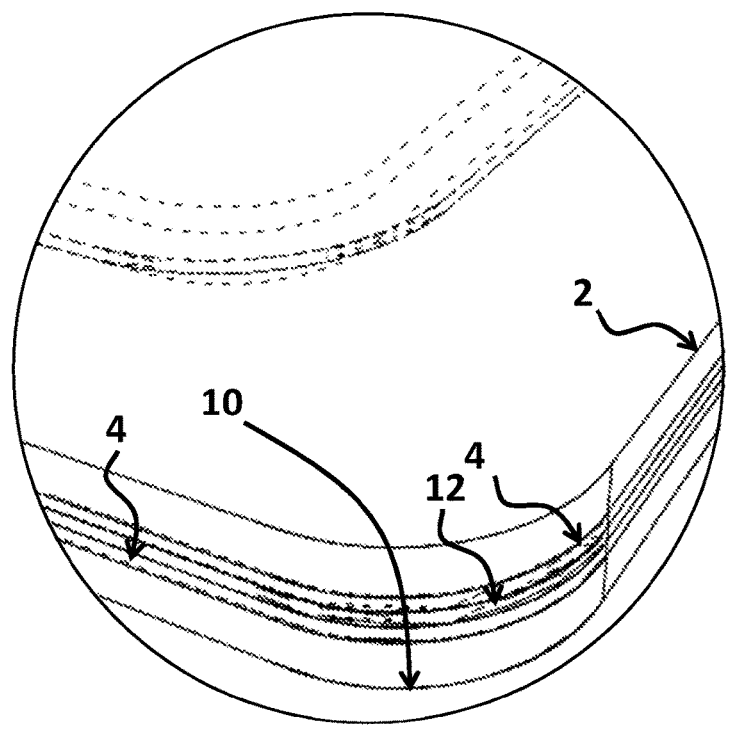
FIG. 8B shows detailed view of the edge of glass of the laminate of FIG. 8A.
Figure 8A:
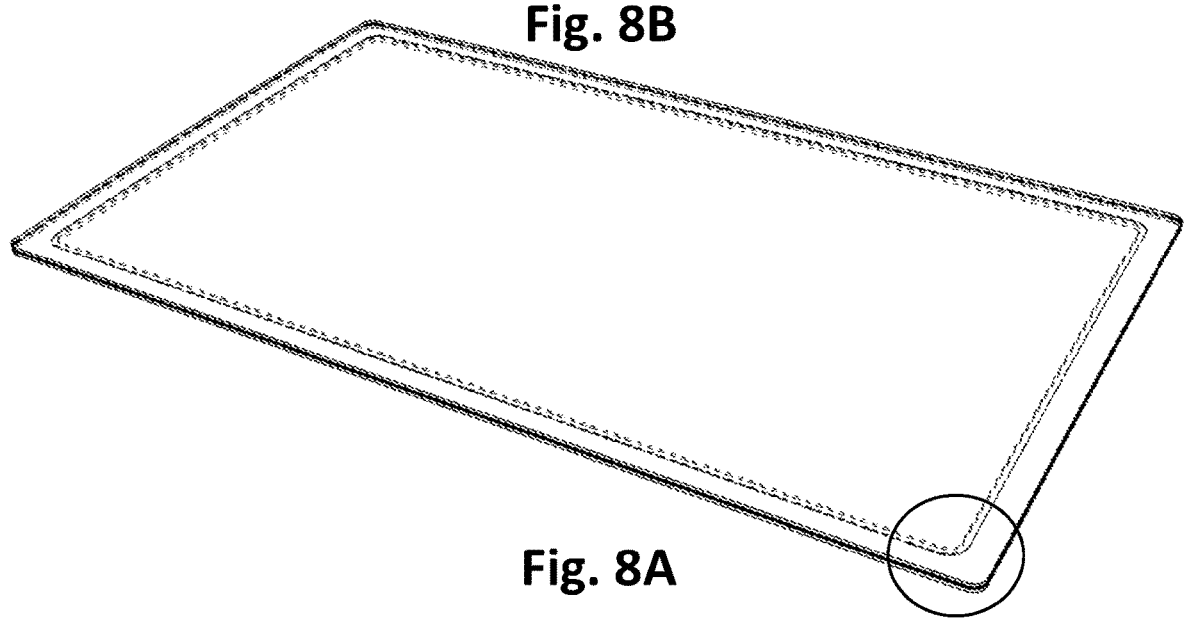
FIG. 8A shows an isometric view of the laminate of FIG. 3.

In some of the embodiments, such as that shown in FIGS. 6A and 6B, a black 6 print is provided to create an obscuration used to hide the frame 12 from the interior and exterior of the vehicle. On fixed parts, glued to the vehicle 18, as shown in FIG. 7, the black obscuration 6 also serves to hide the adhesive 7 and to protect the adhesive 7 from ultraviolet. The black obscuration can be produced on any of the substrate surfaces including the glass, interlayer, film and plastic. Black frit (black obscuration) is a type of ink made from a mix of high temperature black pigments, fine ground glass and an organic carrier and binder. Black frit is commonly applied by silk screen printing or ink jet printing and used on automotive glazing to provide for an obscuration to hide the interior trim and the adhesive used to mount the glazing in the vehicle. The black frit is applied before the bending of the glass. During the bending process, the glass powder fuses with the surface of the glass making for a durable permanent bond. Black frit may be used to provide for the opaque layer required by printing on surface two of the glass layer. Colors, other than black, may be used as well as other inks and types or printing processes. The print may be made on layers other than the glass such as the bonding layer and film layer.

The frame 12 itself can be painted or otherwise embellished to improve the aesthetic so as to not require an obscuration. As an example, the frame 12 could be made of carbon fiber composite which would enhance the aesthetic giving the glazing a high tech look. The functional requirements for the frame 12 include providing the glazing with resistance to breakage by reinforcing the glazing in the periphery areas and after breakage to support the remaining components of the glazing inside of the frame 12 preventing collapse of the window. The frame 12 itself also serves as a barrier to penetration when the glazing is struck directly in the area of the frame 12. The level of support required will vary with the application, the design of the vehicle window opening and the thickness of the conventional glazing that the opening is designed for.

The steel frame 12 of the exemplary embodiments may be formed through the use of a conventional metal stamping process. On flat and relatively flat parts, the frame 12 may be LASER cut from flat sheet and cold bent to the contour of the bent glass.

As the invention serves as a direct replacement for conventional glazing, with no modification to the vehicle, the outboard edge of the frame 12 and plastic layer 10 needs to be offset inboard from the outboard edge of glass on some parts, as shown in FIGS. 4, 5A, 5B, 9A, 9B, 10A and 10B. The frame 12 and plastic layer 10 offsets will also vary with the application, the design of the vehicle window opening and the thickness of the conventional glazing that the opening is designed for.

A typical tempered door window has a thickness that is in the range of 3.2 mm to 4.0 mm with a variance of +1-0.2 mm from nominal. The channel 20 (FIG. 4) and seals are designed for this range but do allow for some additional variation in build, temperature and other factors. The seals and channels 20 are also fabricated of soft compliant materials such as rubber. It is very important to maintain a good seal so as to prevent wind noise and water ingress.

A 7 mm thick glazing would not normally work in such a door unmodified. If the seals and channels 20 were wide enough to accommodate, most likely, the force required of the motor to open and close the window would be too high. In the exemplary embodiments, the frame 12 is offset by 6 mm and the plastic layer by 12 mm from the edge of the glass. Thus, only the thinner portions of the glazing, near the edges need to fit inside of the channels 20 and seals, allowing for normal operation and a good fit and seal. Actual offsets, once again, will depend upon the specific vehicle.

In some cases, where the glazing is fixed and glued into place, no offset may be needed. If a fixed flush glazed 4 mm window is being replaced with a 7 mm intrusion resistant window, the new window will protrude outboard towards the exterior by 3 mm. This may not be objectionable for some vehicles. Otherwise, and offset can be used to provide for a 7 mm glazing that is flush and does not protrude.

In different embodiments of the present invention, a frame 12 constructed of 1-2 mm carbon steel is used. However, a wide variety of materials, which can provide equivalent level stiffness and strength can be used. Examples include but are not limited to: aluminum, carbon composite, fiberglass reinforced plastic, titanium, stainless steel and some plastics. Other material, not yet known, may also be found which will also meet the functional requirements. Likewise, the thickness can be outside of the range of 1-2 mm depending upon the material and the applicant. As an example, a high strength steel would not need to be as thick as an ordinary mild steel frame 12.

As shown in FIGS. 3, 4, 5A, 5B, 7, 9A, 9B, 10A and 10B, inside of the frame, a spacer 14 is used. The spacer serves to support the area surrounded by the frame. The spacer must be comprised of a transparent material and have a thickness that is about the same as the frame. The material may be any suitable transparent material such as glass, polycarbonate, acrylic, polyurethane or other equivalents. A bonding layer material may also be used such for the spacer as polyvinyl butyl (PVB), ionoplast polymers, ethylene vinyl acetate (EVA), cast in place (CIP) liquid resin and thermoplastic polyurethane (TPU) can also be used.

The glass layer is formed using gravity bending, press bending or cold bending. Gravity and press bending methods for forming glass are well known in the art and will not be discussed here. On parts with minimal curvature, a flat sheet of glass can be bent cold to the contour of the frame 12 which maintains the curvature of the glass.

The plastic layer 10, shown in FIGS. 3, 4, 5A, 5B, 7, 8, 9A, 9B, 10A and 10B, is formed using any of the methods and processes typical for the specific material and know in the art including but not limited to thermoforming, injection molding and vacuum molding A flat plastic sheet can be cold bent to conform to the bent glass and/or frame 12 on parts with minimal curvature. The plastic layer 10 is comprised of a transparent plastic such as but not limited to a polycarbonate, acrylic or equivalent. By using a plastic layer 10, rather than a glass interior layer, intrusion resistance is enhanced as the plastic layer 10 does not fail in the same manner that glass does. The plastic will tend to bend and undergo plastic deformation prior to breaking.

Figures 10A, 10B:
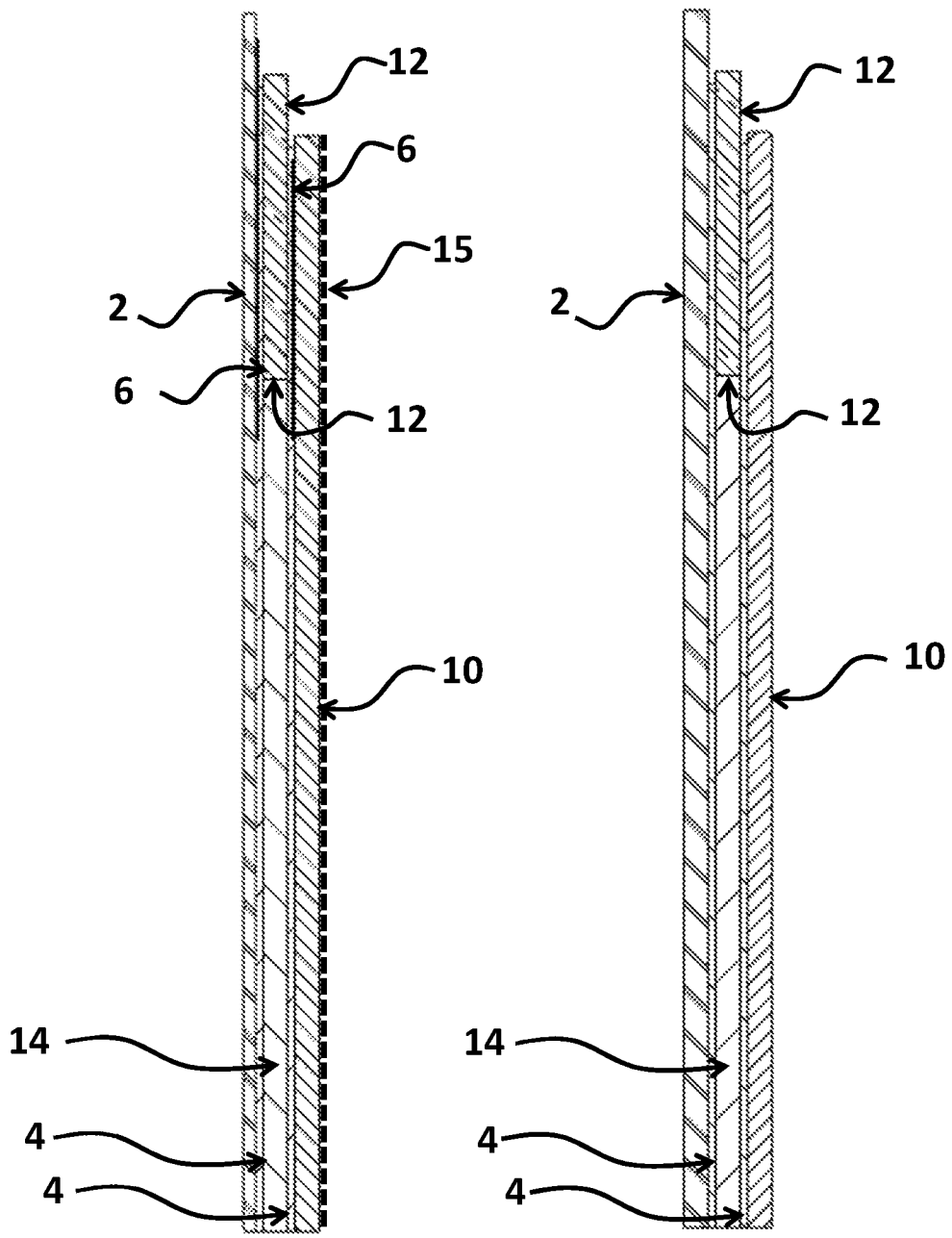
FIG. 10A shows a cross section of a laminated glass according to an embodiment of the present invention.
FIG. 10B shows a cross section of a laminated glass according to an embodiment of the present invention.

Scratch resistance coatings 15, as shown in FIG. 10A, are widely known in the art and typically used on transparent plastics such as automotive headlamp housings. A common type envisioned in the embodiments includes silica coatings applied using a magnetron sputtered vacuum deposition (MSVD) process or by a sol-gel process. As can be appreciated, other chemistries and application methods are available and will become available which are equivalent. The scratch resistant coating is provided for additional protection.

Preferred Embodiments

Embodiment 1 is shown in FIG. 5A and is comprised of: 3 mm glass 2; black 6; IR coating 5; 0.62 mm PU 4; 1 mm frame 12; 1 mm PU spacer 14; 0.62 mm PU 4; black 6 and 2 mm plastic 10.

Embodiment 2 is shown in FIG. 5B and is comprised of: 3 mm glass 2; black 6; 0.62 mm PU 4; IR film 3; 0.62 mm PU 4; 1 mm frame 12; 1 mm PU spacer 14; 0.62 mm PU 4; black 6 and 2 mm plastic 10.

Figures 9A, 9B:
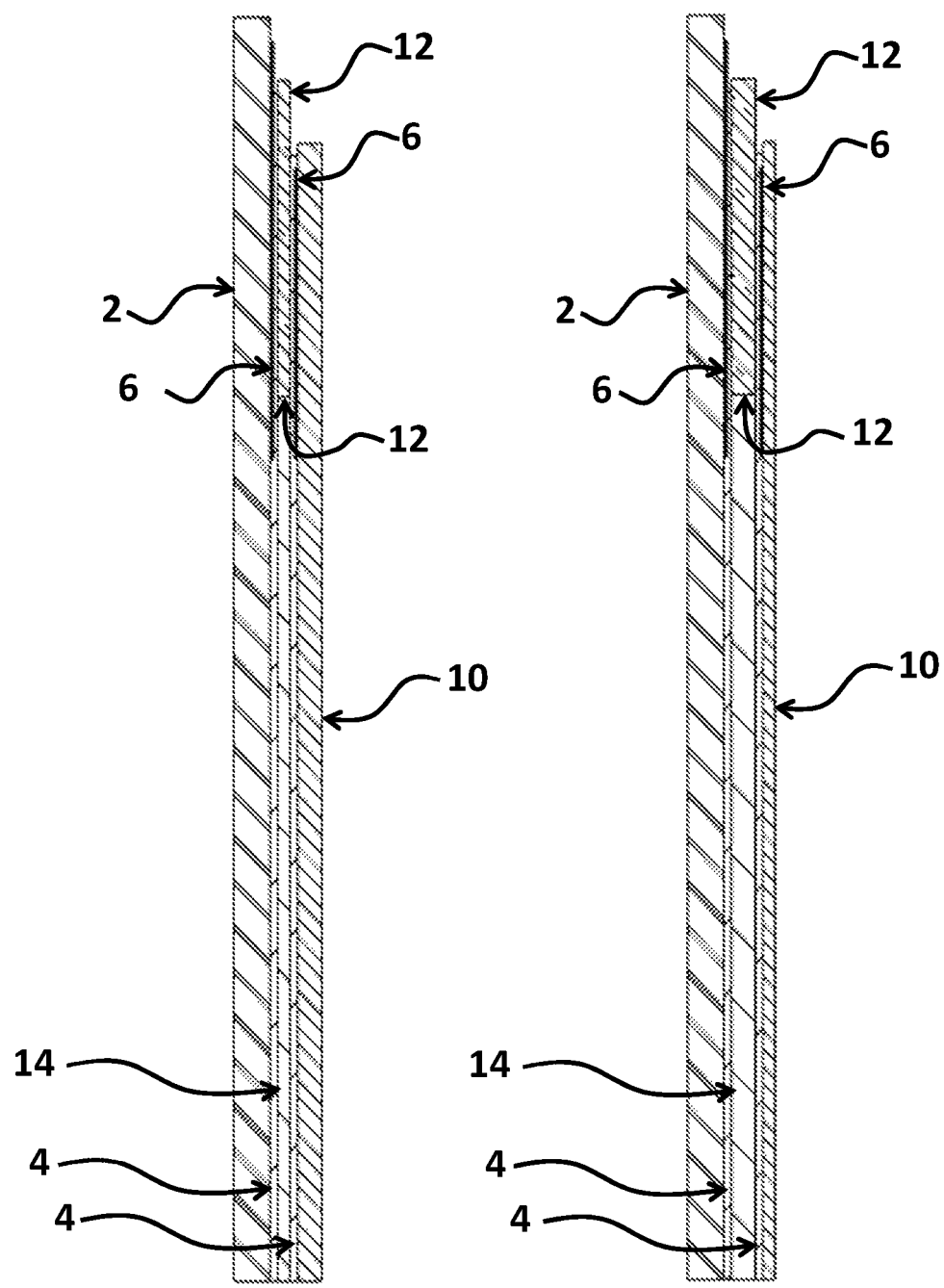
FIG. 9A shows a cross section of a laminated glass according to an embodiment of the present invention.
FIG. 9B shows a cross section of a laminated glass according to an embodiment of the present invention.

Embodiment 3 is shown in FIG. 9A and is comprised of: 3 mm glass 2; black 6; 0.62 mm PU 4; 1 mm frame 12; 1 mm PU spacer 14; 0.62 mm PU 4; black 6 and 2 mm plastic 10.

Embodiment 4 is shown in FIG. 9B and is comprised of: 3 mm glass 2; black 6; 0.62 mm PU 4; 2 mm frame 12; 2 mm PU spacer 14; 0.62 mm PU 4; black 6 and 1 mm plastic 10.

Embodiment 5 is shown in FIG. 10A and is comprised of: 1 mm glass 2; black 6; 0.62 mm PU 4; 2 mm frame 12; 2 mm PU spacer 14; 0.62 mm PU 4; black 6 and 2 mm plastic 10 with a scratch resistant coating 15.

Embodiment 6 is shown in FIG. 10B and is comprised of: 2 mm glass 2, 0.62 mm PU 4, 2 mm frame 12, 2 mm PU spacer 14, 0.62 mm PU 4 and 2 mm plastic 10.

Further, it can be appreciated that all of the embodiments described can be further enhanced through the application of a scratch resistant coating to the surface one 101 (as described in FIG. 2 above) of the glass layer and/or the surface four 104 of the plastic layer. An anti-reflective coating can also be beneficial when applied to the surface four 104 of the plastic layer.

It must be understood that this invention is not limited to the embodiments described and illustrated above. A person skilled in the art will understand that numerous variations and modifications can be carried out that do not depart from the spirit of the invention, which is only defined by the following claims.

The invention claimed is:

1. An automotive laminate comprising:
   a glass layer having oppositely disposed major faces;
   a frame having oppositely disposed major faces and an interior portion;
   a spacer having oppositely disposed major faces;
   a plastic layer having oppositely disposed major faces; and
   at least two bonding layers;
   wherein said frame substantially surrounds the vision area of said laminate;
   wherein said spacer comprises a transparent material with said spacer having a thickness which is about the same as said frame and sized to fit the interior portion of said frame;
   wherein one major face of said frame and corresponding major face of said spacer are bonded to corresponding major face of said glass layer by means of a first bonding layer of said at least two bonding layers; and
   wherein opposite major face of said frame and corresponding major face of said spacer are bonded directly to corresponding major face of said plastic layer by means of a second bonding layer of said at least two bonding layers.

2. The automotive laminate of claim 1, wherein the edge of the frame and the plastic layer are offset inboard from the edge of said glass layer.

3. The automotive laminate of claim 1 wherein the edge of the plastic layer is offset inboard from the edge of said frame.

4. The automotive laminate of claim 1, wherein the frame is substantially made of a material selected from the group consisting of: steel, aluminum, titanium, plastic and carbon composite.

5. The automotive laminate of claim 1 further comprising a heat reflecting layer.

6. The automotive laminate of claim 1 further comprising a heat absorbing layer.

7. The automotive laminate of claim 1, wherein the glass layer is a heat strengthened glass layer.

8. The automotive laminate of claim 1, wherein the glass layer is a borosilicate glass layer.

9. The automotive laminate of claim 1, wherein the glass layer is a chemically strengthened glass layer.

10. The automotive laminate of claim 1, wherein the glass layer has a thickness in the range of about 0.4 mm to about 3.0 mm.

11. The automotive laminate of claim 1, wherein the plastic layer has a thickness in the range of about 0.4 mm to about 3.0 mm.

12. The automotive laminate of claim 1, wherein the frame has a thickness in the range of 1.0 mm to 3.0 mm.

13. The automotive laminate of claim 1, wherein the laminate has a thickness in the range of about 5.0 mm to about 9.0 mm.

14. The automotive laminate of claim 1 further comprising a sound deadening layer.

15. The automotive laminate of claim 1, wherein at least one layer of the following: glass layer, frame and plastic layer, is formed by means of a cold bending process.

16. The automotive laminate of claim 1 further comprising a hard scratch resistant coating on surface one of said glass layer.

17. The automotive laminate of claim 1 further comprising a hard scratch resistant coating on surface four of said plastic layer.

18. The automotive laminate of claim 1 further comprising an anti-reflective coating on the surface four of said plastic layer.

19. The automotive laminate of claim 1 further comprising an infrared reflecting layer.

20. A vehicle comprising the automotive laminate of claim 1.

* * * * *